May 12, 1931.    T. GILL    1,804,928
ASPARAGUS TRIMMING MACHINE
Filed May 27, 1930    3 Sheets-Sheet 1

INVENTOR
Thomas Gill
BY
ATTORNEY

May 12, 1931.  T. GILL  1,804,928
ASPARAGUS TRIMMING MACHINE
Filed May 27, 1930   3 Sheets-Sheet 2

INVENTOR
Thomas Gill
BY
ATTORNEY

May 12, 1931.                 T. GILL                 1,804,928
                    ASPARAGUS TRIMMING MACHINE
                    Filed May 27, 1930    3 Sheets-Sheet 3

INVENTOR
Thomas Gill
BY
ATTORNEY

Patented May 12, 1931

1,804,928

UNITED STATES PATENT OFFICE

THOMAS GILL, OF JERSEY, CALIFORNIA

ASPARAGUS TRIMMING MACHINE

Application filed May 27, 1930. Serial No. 456,051.

This invention relates to a machine for trimming the butts from asparagus stalks as they are cut in the field and before the asparagus is shipped to the cannery or other destination, in order that the asparagus when thus shipped will be all the same length. The machine is particularly intended to be used in connection with the packing frame or rack shown in my copending application for Patent Serial No. 449,885, filed May 5, 1930. My principal object is to provide a machine by means of which the filled rack may be definitely located in place, the asparagus then clamped against possible shifting, and all the butts on both sides of the rack simultaneously cut off so that all the stalks will be the same length. The cutting is done by hand controlled power driven cutters, and all the operations necessary to the functioning of the machine are so simple, that trimming is very easily effected with a minimum of time and effort on the part of the workers being necessary. As a result of the use of my machine trimming operations are considerably expedited over what is necessary with the present and usually crude equipment used for the purpose.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
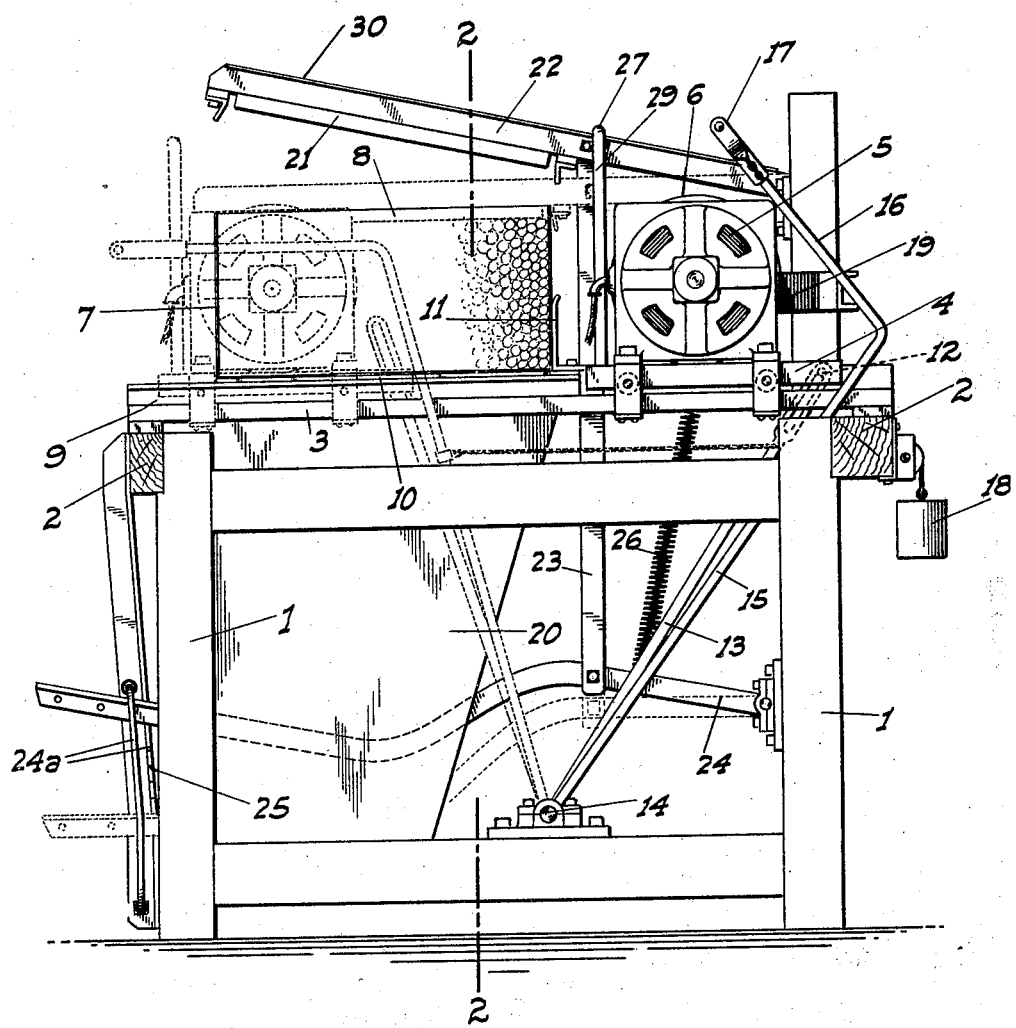
Fig. 1 is a side elevation of the machine with a filled rack in place showing the cutters retracted and the clamping plates released.
Figure 5:
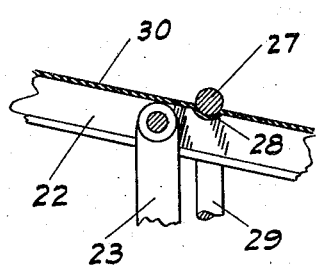
Fig. 5 is a fragmentary sectional elevation of a clamping plate support showing the means for then locking the cutter motors against undesired advancement.

Referring now more particularly to the characters of reference on the drawings, the machine comprises a main frame which includes corner uprights 1, supporting transverse end-beams 2. Supported on and extending between these beams are transversely spaced pairs of rails 3, on each pair of which a frame 4 is slidably mounted, each frame having an electric motor 5 clamped thereon. The frame is perferably in the form of a small truck having rollers which engage the rails so as to reduce friction to a minimum. The axes of the two motors are horizontal and transverse and are alined with each other. Fixed on the adjacent ends of the motor shafts are cutting discs 6, which are spaced apart a distance just sufficient to clear the side edges of the end walls 7 of the double asparagus holdings rack 8, which is placed between the cutters and which is of the form shown in said previously mentioned copending application. The bottom of the rack rests on a platform 9 supported by the cross beams 2 centrally between the rails and somewhat narrower than the rack. Said rack has longitudinal bottom cleats 10 adjacent its side edges which overhang the said edges of the platform, thus forming guides for locating the rack centrally in position relative to the cutting discs. A back stop 11 at the rear end of the platform limits the movement of the rack along the platform.

Each motor frame is provided with a cross-pin 12 engaged by a longitudinally slotted arm 13 which depends to and extends radially from a cross-shaft 14 journaled on the main frame near the ground. A lever 15 projects upwardly from the shaft, preferably adjacent its right hand end and terminates in a forwardly angled extension 16 having a handle 17 on its outer end.

The length of the rails is sufficient to enable the motor when fully retracted to be entirely clear of the rack to the rear of the same, as shown in Fig. 1. The motors are normally moved toward and held in such position by a counterweight 18 operatively connected to the lever 15; the motors or their supporting frames then engaging bumpers 19 mounted in connection with the main frame at its rear end. When the handle is pulled forwardly with the motors in operation, the cutting discs will engage the butts of the asparagus which project beyond the side edges of the rack on both sides and will cut the same off evenly throughout the length and height of the rack; the diameter of the discs being greater than the height of the rack and projecting a short distance both above and below the same. The current carrying cables for the motors are of course flexible and capable of the necessary extension to permit of the horizontal travel of the motors, but the proper arrangement and mounting of these cables obviously presents no problems of any moment. The cut portions of the butts drop into a hopper or bin 20 extending downwardly from just under the platform 9; said hopper being wider at its top than the platform, and extending the full length of the same, so as to catch all the butts.

Figure 2:
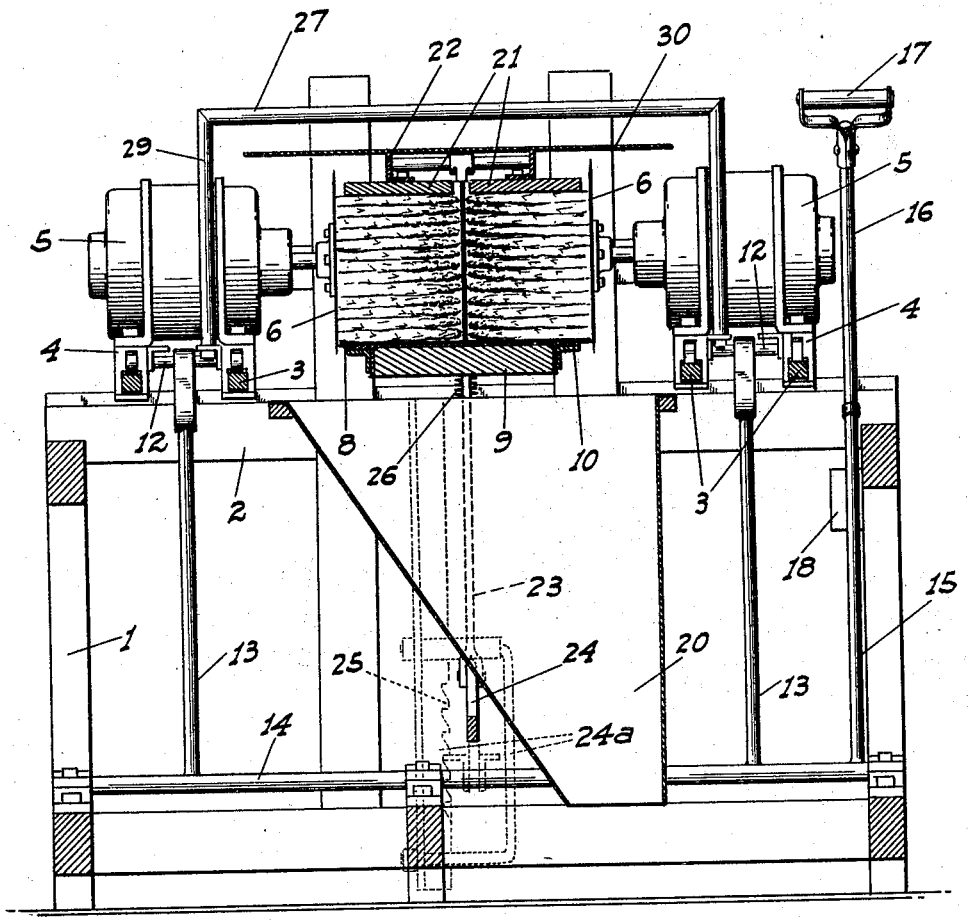
Fig. 2 is a cross section on the line 2—2 of Fig. 1 showing the clamping plates as engaged with the asparagus and the cutters retracted after having effected a trimming of the butts of the asparagus in the rack.
Figure 3:
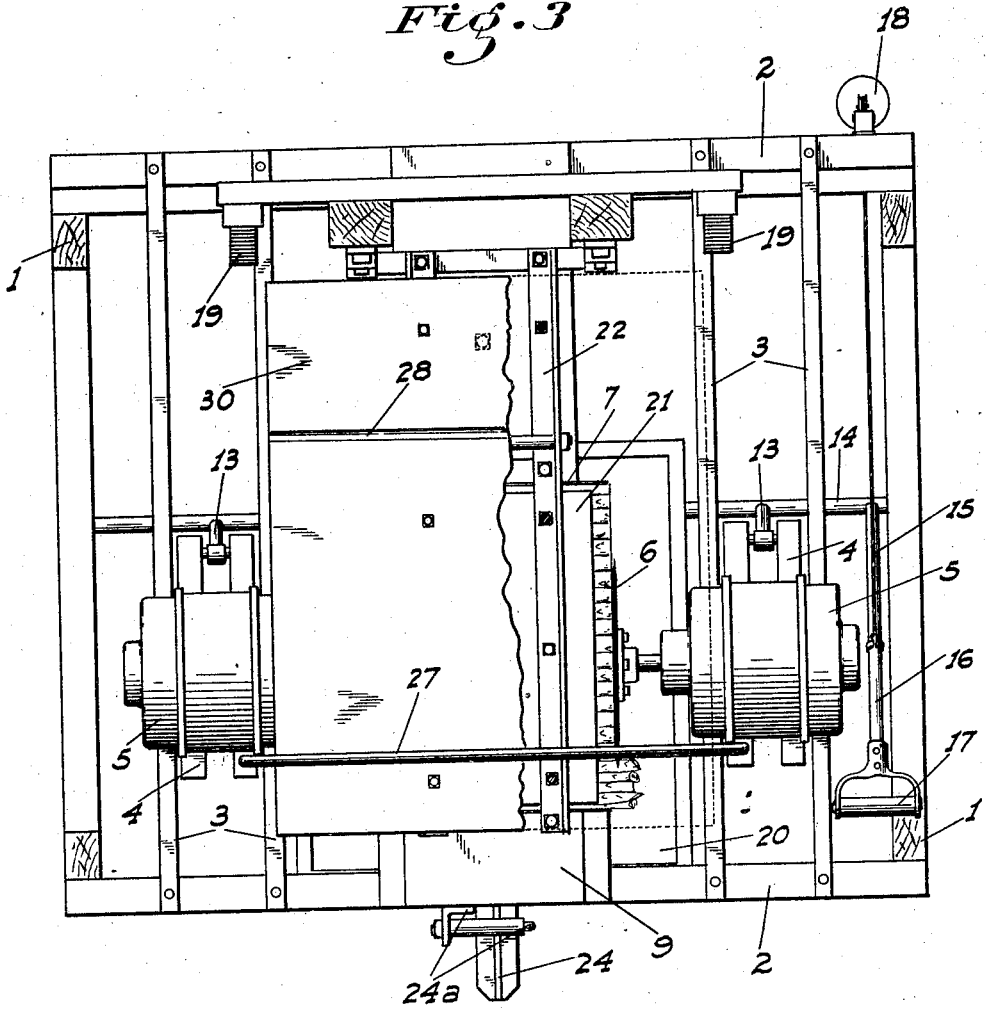
Fig. 3 is a top plan view of the machine showing the guard plate partly broken away and the cutters partly advanced in a trimming movement.
Figure 4:
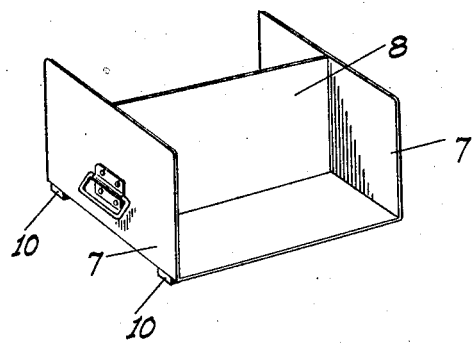
Fig. 4 is a perspective view of the rack used in connection with the machine.

In order to hold the asparagus more or less compressed in the rack while cutting operations are in progress, and also to hold the rack against possible longitudinal movement, I provide plates 21 adapted to fit more or less snugly between the end walls of the rack and on both sides of the central partition of the same, as shown in Fig. 2. These plates are secured on rigid bars 22 which extend to the rear end of the machine and are there pivoted in connection with the main frame.

A vertical link 23 depends from between and is flexibly connected to the bars 22 just rearwardly of the plates and back-stop 11, and is connected on its lower end to a substantially horizontal foot-lever 24. This lever is pivoted on the rear end of the machine toward the ground and extends to and beyond the front end of the frame. Adjacent said front end of the frame the lever passes through a vertical guide 24a which on one side has notches as at 25 to engage the lever when depressed and enable the same to be held against upward movement. When the lever is thus engaged with the notches the plates 21 are in firm pressing engagement with the asparagus. A spring 26 acts on the lever to normally raise the same and of course the bars 22 and presser plates also. When the plates are raised, which does not need to be any very great extent, the rack may be easily placed in or removed from such platform by sliding the same endwise and of course from the front of the machine. To prevent the motors from being drawn forwardly from their retracted position when the presser plates are thus raised, I provide a cross-rod 27 which extends over the bars 22 and is adapted to seat in notches 28 cut in the upper surface of the bars. The rod at its ends is formed with or secured to rigid standards 29 which project upwardly from the motor frames 4. To prevent the possibility of the operator coming in contact with the discs, which must be very sharp, a protecting plate 30 is fixed in connection with the bars 22 from end to end of the same and extending transversely a sufficient distance to well overhang the plane of the discs. This plate, if such is used, is of course the member which is actually engaged by the rod 27, and the notches in the bars to be engaged by said rod take the form of a continuous transverse groove in said plate as shown.

In operation the presser plates are first released and the motors allowed to move to their fully retracted position. A filled rack to be trimmed is then slid in place on the platform 9, the presser plates are depressed into position by one foot of the operator pressing down on the lever 24. He then grasps the handle 17 with his right hand and pulls the same forwardly until the discs have traversed the entire length of the racks. This operation of course almost instantly cuts off all the butts, which drop into the hopper. The handle 17 is then released, permitting the counterweight 18 to draw the motors back to their retracted position, the presser plates are then released by releasing the lever 24 and the trimmed rack is removed from the machine. As will be obvious from the above description of operations the trimming of the asparagus in the rack, from the placing of the rack into position to the removing of the same after the asparagus has been trimmed, consumes but a relatively few seconds of time.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. An asparagus trimming machine for use in connection with a double asparagus holding rack from both sides of which the butts of asparagus stalks initially project, including supporting and locating means for the rack, cutters mounted for movement in parallel planes adjacent and along the sides of the rack, and means for moving the cutters simultaneously to cause them to be drawn through the projecting butts.

2. An asparagus trimming machine for use in connection with a double asparagus holding rack from both sides of which the butts of asparagus stalks initially project, including supporting and locating means for the rack, cutting discs disposed in vertical planes adjacent the sides of the rack, driving means for the discs directly connected thereto, means supporting said driving means for movement lengthwise of the rack, and means applied to said driving means for thus moving the same simultaneously.

3. An asparagus trimming machine for use in connection with an asparagus holding rack from one side of which the butts of the asparagus stalks initially project, including supporting and locating means for the rack, a cutting element mounted for movement adjacent and along the said side of the rack, means for thus moving the cutting element and releasable means to engage the asparagus in the rack to press the same down and also hold the rack against removal.

4. An asparagus trimming machine for use in connection with an asparagus holding rack from one side of which the butts of the asparagus stalks initially project, including supporting and locating means for the rack, a cutting disc disposed in a vertical position adjacent said side of the rack, driving means for the disc directly connected thereto, horizontal rails disposed parallel to the rack on which said driving means is slidably connected, an arm flexibly connected to and depending from said driving means, a crossshaft on which the lower end of said arm is mounted, and an operating lever connected to and projecting upwardly from said shaft.

5. A structure as in claim 3 with means between the cutting element and releasable means preventing horizontal movement of the cutting element when said releasable means is in a released position.

6. An asparagus trimming machine for use in connection with an asparagus holding rack from one side of which the butts of the asparagus stalks initially project, including means for slidably supporting and locating said rack in a horizontal position, the top of the rack being freely open, a presser plate for engagement with the top layer of asparagus in the rack, means pivotally mounting said plate from beyond the rack, means normally holding said plate raised, manual means for depressing the plate, and cutting means mounted in pre-determined relationship to the rack supporting means for movement along the side of the rack from which the butts project.

7. An asparagus trimming machine for use in connection with an asparagus holding rack from one side of which the butts of the asparagus stalks initially project, including means for slidably supporting and locating said rack in a horizontal position, the top of the rack being freely open, a presser plate for engagement with the top layer of asparagus in the rack, means normally holding said plate raised, manual means for depressing the plate, a power driven cutting disc, means supporting said disc for movement adjacent and along the side of the rack from which the butts project, hand means for thus moving the disc, the supporting means being arranged to permit the disc when fully retracted to lie beyond one end of the rack; and means between said disc supporting means and the presser plate for holding the disc against movement from retracted position when the plate is in a raised position.

8. An asparagus trimming machine for use in connection with an asparagus rack from one side of which the butts of the asparagus stalks initially project; said machine including supporting and locating means for the rack, a vertical cutting element movable along said side of the rack, a support for the element whereby to thus move the same, a presser member mounted on the machine for engagement with the asparagus in the rack to press the same down, means to raise and lower said member, means applied to the cutter support to normally move the same so that the cutter is retracted relative to the rack, and means between the support and member to prevent advancing movement of the support when the member is raised.

9. An asparagus trimming machine for use in connection with an asparagus rack from one side of which the butts of the asparagus stalks initially project; said machine including supporting and locating means for the rack, a vertical cutting element, positioned in a transverse plane adjacent said side of the rack, a horizontally movable support on which the cutter is mounted, means applied to the support to move the same to a position such that the cutter is retracted rearwardly of the rack, a longitudinal bar over the rack and pivoted at its rear end on the machine, a presser member supported by the bar to engage the asparagus in the rack and press the same down, means normally holding the bar and member raised, means to pull the bar down, a cross bar mounted on the cutter support and overhanging the longitudinal bar; the latter having a notch to engage the cross bar when the cutter support is fully retracted and the presser member is fully raised.

In testimony whereof I affix my signature.

THOMAS GILL.